March 24, 1953  J. B. BLACK  2,632,354
BLIND BOLT
Filed April 25, 1949  2 SHEETS—SHEET 1
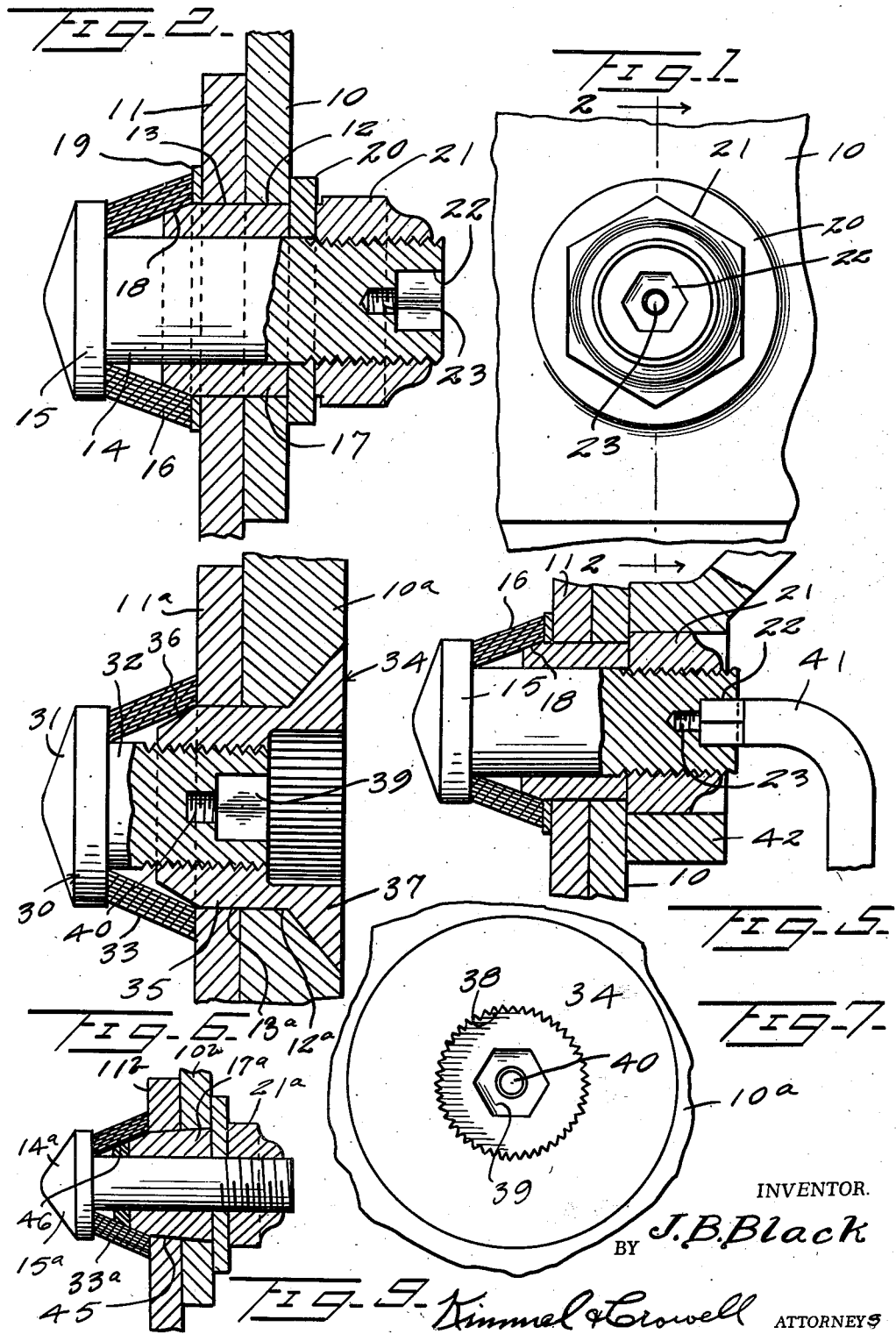

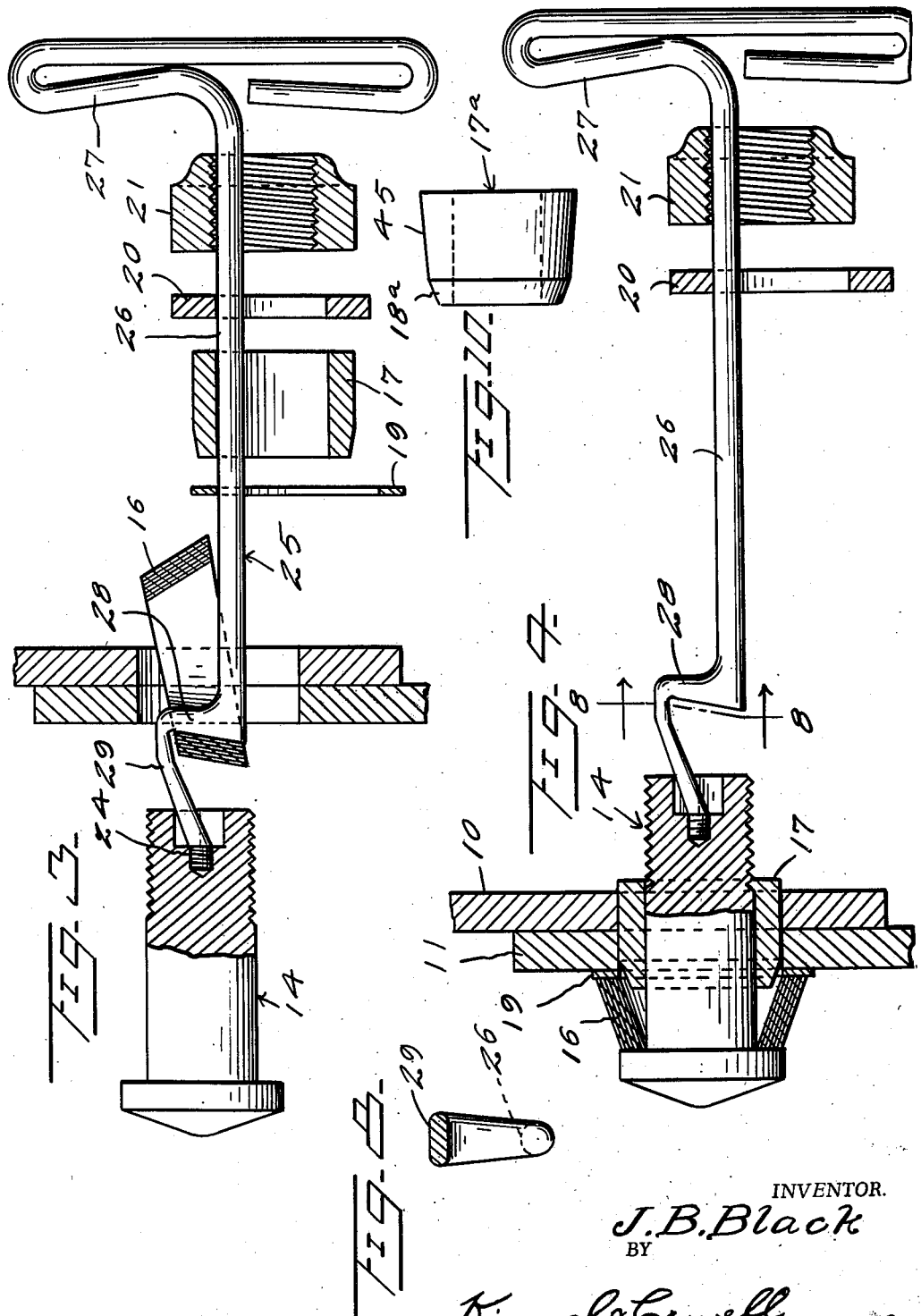

Patented Mar. 24, 1953

2,632,354

UNITED STATES PATENT OFFICE 2,632,354

BLIND BOLT

John B. Black, Garrett, Pa.

Application April 25, 1949, Serial No. 89,522

2 Claims. (Cl. 85—2.4)

This invention relates to bolts and nuts.

In the securing of two or more elements together by means of bolts and nuts, where tools may be engaged with the bolts and nuts on opposite sides of the elements, the securing together of the elements is not a difficult matter. However, where the elements are such that the entire operation must be performed from one side of the outer element, such as the outer side of a tank or the like, a conventional nut and bolt cannot be used. It is, therefore, an object of this invention to provide an improved nut and bolt together with appropriate washers whereby the bolt may be inserted from the outer side, and a compressible or distortable washer inserted after the bolt for interposing between the bolt head and the inner side of the inner element so that when the nut is threaded onto the bolt, the washer will bear against the inner element and hold the bolt against outward movement.

Another object of this invention is to provide an improved nut and bolt, together with a distortable washer, bushing and nut, and also an improved inserting tool whereby those parts which are to be extended through the opening in the elements may be held in unassembled form and subsequently the parts may be partially or loosely secured together while still retained on the inserting tool. After the parts have been at least partially assembled, the inserting tool is withdrawn and the parts may then be tightened to the desired degree by use of one or more wrenches. In the final firm tightening of the nut and bolt, a wrench is engaged in a polygonal socket formed in the outer end of the bolt, and a spanner or socket wrench is engaged with the nut. In one form of the invention the nut is formed with a splined socket for receiving a splined wrench head, and the nut also includes a centering sleeve for centering the nut and bolt in the opening formed in the elements.

A further object of this invention is to provide an improved bolt and nut which may be inserted from one side and which are suitable for use in a highly loaded structure where the shear and tension stresses approach the yield or ultimate strength of the bolt itself.

A further object of this invention is to provide a bolt and nut which are insertable from one side and will provide a tight fit which approaches a press fit to thereby give ultimate shear and strength and prevent loosening of the nut and bolt under unusual vibration.

A further object of the invention is to provide a bolt and nut which when inserted and tightened may also be withdrawn in the reverse operation of insertion, the entire parts of which will be undamaged and re-usable.

A further object of this invention is to provide an improved inserting tool which will permit the insertion of the bolt and certain parts associated therewith through an opening and which may be secured in operative position by means of the remaining parts which are loosely mounted on the tool, the latter being withdrawn through the partially assembled parts which are later tightened to the desired degree.

It will be understood therefore, that the main object of this invention is to provide a means of fastening together two or more components in a structure, device, etc., at locations where desired or in locations not possible to attach by any other method because in design there are many problems which come up before the designer where due to the nature of the article being constructed he is confronted with the problem of personnel being able to work only on one side of a surface such as a wall or tank or other similar structure. He can drill a hole through this surface and insert a fastener, but he is not able to apply a nut or other strong device to the fastener on the other side of the surface due to the impossibility of gaining access to it, both to get the nut there and to hold it from turning while he tightens the bolt.

Many ingenious methods have been devised in an attempt to solve this problem. In almost every case these attempts have consisted of changing the design of the article being constructed which invariably raises the final cost of the product due to the added complication.

The object of this invention, namely to design a bolt which can be inserted through a hole in a surface without anyone ever in the course of construction having to touch the far wall or its surface and provide a fit with such surface even as tight as a press fit for the bolt and giving ultimate shear and tensile strength, is accomplished by the means here described.

A further object of this invention is to provide a bolt and nut with a double tapered sleeve to wedge itself in the holes of the objects to be fastened so tightly as to eliminate all tolerance and to remove slippage in shear.

A further object of this invention is to provide a nut and bolt which can be inserted from one side and which when tightened will form a structural fastening and seal its own hole against the leakage of liquids or gases.

It will be understood that with the above and other objects in view, my invention consists in the arrangement, combination and details of construction disclosed in the drawings and specification and then more particularly pointed out in the appened claims.

In the drawings:

Figure 1 is a detail end elevation of a bolt constructed according to an embodiment of this invention, Figure 2 is a sectional view taken on the line 2—2 of Figure 1, Figure 3 is a longitudinal section partly in detail, showing the nut and bolt with associated parts, in the initial position and mounted on an inserting tool, Figure 4 is a view similar to Figure 3, showing the bolt with the distortable washer in applied position prior to the tightening of the nut.

Figure 5 is a fragmentary sectional view showing the bolt with the nut and bolt engaged by wrenches for firmly tightening the nut and bolt to hold the parts together, Figure 6 is a vertical section of a modified form of this invention, Figure 7 is an outer end elevation of the structure shown in Figure 6, Figure 8 is a fragmentary sectional view taken on the line 8—8 of Figure 4, Figure 9 is a sectional view of another modification of the invention, Figure 10 is a detailed side elevation of the wedging sleeve shown in Figure 9.

Referring to the drawings and first to Figures 1 to 5 inclusive, the numerals 10 and 11 designate generally a pair of elements which are to be secured together, the element 11 being an inner element which cannot be contacted from the outside, and may be one part of a wall of a tank or the like. The two elements 10 and 11 are formed with registering openings 12 and 13 respectively, and a bolt generally designated as 14 is partially inserted through the registering openings 12 and 13, with the head 15 of the bolt being innermost.

A truncated conical washer 16 which is preferably of laminated construction, with the laminations thereof secured together in any suitable manner, is adapted to be inserted through the registering openings 12 and 13, and the larger end of the washer 16 is disposed in confronting position to the inner side of the inner element 11. A cylindrical sleeve 17 is inserted in the registering openings 12 and 13, and preferably the sleeve 17 is of such size that when the sleeve is disposed with the outer end thereof flush with the outer surface of the outer element 10, the sleeve 17 will be held within the openings 12 and 13 by a substantial pressed fit.

The sleeve 17 may be formed to the shape 17a as shown in Figure 10, with a double taper as follows: one taper being of considerable angle to fit the truncated conical washer 16. From its largest diameter a second taper progresses along surfaces 12 and 13, terminating at washer 20. This taper is of much smaller angle so that it will wedge itself tightly in the holes in 11 and 12 which may or may not be taper reamed to accommodate the sleeve.

The inner end of the sleeve 17 is adapted to project inwardly from the inner surface of the inner element 11 and into the base or large end of the washer 16. The inner end portion of the sleeve 17 is bevelled or tapered, as indicated at 18, so that when the sleeve 17 is forced inwardly, the inner end of the sleeve 17 will tend to reshape the washer 16 and will also form a shoulder against which the inner surface of the washer 16 may contact.

A ring or annulus 19 is interposed between the base of the frusto-conical washer 16 and the inner side of the inner element 11, and an outer washer 20 is adapted to bear against the outer end of the sleeve 17 and when the nut 21 is threaded onto the bolt 14, the outer washer 20 will press against the outer end of sleeve 17 to forcibly move this sleeve inwardly into the openings 12 and 13.

The nut 21 is formed with an outer polygonal nut surface and the outer end of the bolt 14 is formed with a polygonal socket 22 which is adapted to be engaged by a polygonal plug wrench so that the bolt 14 may be held against turning when the nut 21 is being tightened. The bolt 14 is also formed at the inner end of the socket 22 with a threaded socket or recess 23 having a right or left hand thread, within which the threaded stud 24 of an inserting tool generally designated as 25 is adapted to initially engage. The inserting tool 25 includes an elongated shank 26 which is formed at its outer end with a head or handle 27, and the shank 26 is provided with a laterally extending projection 28 disposed on an oblique angle to the length of the shank 26 and against which the inner surface of the frusto-conical washer 16 is adapted to initially engage. The projection 28 includes an integral forwardly and inwardly projecting extension 29 which terminates in the threaded stud 24.

Referring now to Figures 6 and 7 there is disclosed a modified form of nut and bolt structure embodying a bolt 30 having a head 31, and a threaded shank 32. A frusto-conical and laminated washer 33 which may be formed of tempered metal is adapted to bear at its small end against the head 31 and is adapted at its large or outer end to bear against the inner surface of the inner element 11a.

A nut generally designated as 34 is threaded on the shank 32 and includes a sleeve or bushing 35 which is adapted to snugly engage in registering openings 12a and 13a which are formed in the elements 10a and 11a respectively. The shank or sleeve 35 is formed at its inner end with a taper or bevel 36 adapted to engage within the base or large end of the frusto-conical washer 33. The nut 34 includes a bevelled head 37 adapted when the nut is in applied position to be flush with the outer surface of the outer element 10a.

The nut 34 is formed centrally thereof with a relatively large socket or recess having splines 38 in the side thereof. The bolt 30 includes a polygonal socket 39 opening outwardly and a right or left hand threaded socket or recess 40 is formed at the base or inner end of the polygonal socket 39. By providing the polygonal socket 39 a plug wrench can be inserted into the outer end of the bolt shank 32 and a circular splined wrench may be inserted into the nut head 37. The nut 34 may then be rotated with the shank 32 held against rotation so that the nut 34 will be extended through the openings 12a and 13a of the elements 10a and 11a and will project partly into the base of the laminated washer 33. The tapered or bevelled inner end of the shank or sleeve 35 of the nut 34 assures the central positioning of the washer 33 about the bolt shank 32 and in a pressure applying position against the inner side of the inner element 11a.

The nut 34 may terminate along a line perpendicular to the center line of the bolt and include a part of sleeve 35. The remainder of sleeve 35 with the bevelled end 36 can be a separate sleeve identical with 17 of Figure 2.

In the mounting of the bolt, nut and associated parts hereinbefore described, the assembly is taken apart and inserted onto the inserting tool 25 after the manner shown in Figure 3. The nut 21 is first placed on the tool 25, followed by the washer 20, the sleeve 17, the washer 19 and the distortable laminated washer 16. The outer end of the bolt 14 is then threaded onto the stud 24. The bolt 14 is then extended through the registering openings 12 and 13 which are substantially the same diameter as the diameter of the head 15 of the bolt. The distortable laminated washer 16 is disposed in the position shown in Figure 3, with the lateral projection 28 of the tool engaging on the inner side of the washer 16. This washer is then forced sidewise through the registering openings 12 and 13, being distorted or ovalized during this operation.

After the washer 16 passes through the inner opening 13, washer 16 will return to substantially its normal configuration and washer 19 may then be distorted or bent to pass through the openings 12 and 13. The two washers 16 and 19 are preferably of tempered material so that they can be distorted or bent, and when pressure has been released they will return to their normal shape.

After the two washers 16 and 19 have been passed through the openings 12 and 13, sleeve 17 is pushed forwardly so as to engage within the openings 12 and 13. Preferably the fit of the sleeve 17 is a relatively tight fit in the openings 12 and 13 so that relatively strong pressure must be exerted against the outer end of the sleeve 17 to move this sleeve completely into the openings 12 and 13.

With sleeve 17 in substantially the position shown in Figure 4, outer washer 20 is moved forwardly and bolt 14 is pulled outwardly through sleeve 17. Nut 21 is then loosely threaded onto bolt 14 whereupon tool 25 may be unthreaded from bolt 14. A plug wrench 41 may then be extended into the wrench socket 22 and a spanner socket wrench 42 may be extended over wrench 41, as shown in Figure 5, and engaged about nut 21. Nut 21 may then be tightened by socket wrench 42 and in the tightening of nut 21, washer 16 will be moved outwardly to tight engagement with washer 19.

Where the nut and bolt structure shown in Figures 6 and 7 is used, the nut and bolt is inserted with inserting tool 25 after the manner hereinbefore described. Inasmuch as nut 34 is a countersunk nut, a pair of plug wrenches will be used, the smaller wrench engaging in socket 39, and a hollow and splined wrench engaged with the splines 38.

Referring to Figures 9 and 10, there is disclosed another modification of this invention wherein a bolt 14a has a nut 21a threaded thereon similar in every detail to the bolt 14 and nut 21. A tapered washer 33a is interposed between bolt head 15a and inner element 11b and a tapered sleeve 17a is disposed about the bolt shank, being formed with a taper or bevel 18a for engagement within washer 33a, and also formed with a second taper 45 adapted to wedgingly engage in the opening of elements 10b and 11b. The openings in elements 10b and 11b may be reamed out to form a tapered hole similar to the taper of sleeve 17a, or these holes may be left straight.

A compressible sealing ring 46 is disposed about bolt 14a, being disposed within washer 33a so that the inner end of sleeve 17a will compress ring or gasket 46 to thereby effect a liquid or gas tight joint.

I do not mean to confine myself to the exact details of construction herein disclosed, but claim all variations falling within the purview of the appended claims.

What I claim is:

1. In combination a bolt adapted for insertion through an opening in one or more elements from the outer side thereof, said bolt including a threaded shank substantially smaller in diameter than said opening, a head carried by said shank and adapted to pass through said opening and having a diameter greater than the diameter of said shank, a resilient, laminated frusto-conical washer about said shank collapsible for insertion through the opening, said washer being engageable at the small end thereof against said head and bearing at the large end thereof against the inner side of said element, the large end of said washer being larger than the diameter of said opening, and a nut threaded onto the outer end of said shank, said shank having a polygonal socket in the outer end thereof for receiving a plug wrench to thereby hold said shank against turning when said nut is tightened thereon said shank also having a threaded socket within said polygonal socket for receiving a tool during the initial positioning of the bolt in the opening.

2. In combination, a bolt adapted for insertion through an opening formed in one or more elements, said bolt including a threaded shank substantially smaller in diameter than said opening, a head on one end of said shank, a laminated frusto-conical washer about said shank bearing at the small end thereof against said head and bearing at the large end thereof against the inner side of said element, said washer being resilient and distortable for insertion through said opening, and a nut threaded onto said shank, said nut having a sleeve engageable in said opening and a recessed head on the outer end of said sleeve, the recess in said head being formed with angular faces for engagement with a wrench, said shank having a polygonal socket in the outer end thereof for receiving a plug wrench and also having a threaded socket at the inner end of said polygonal socket for receiving a tool during the initial positioning of the bolt in the opening.

JOHN B. BLACK.

REFERENCES CITED

The following references are of record in the file of this patent:

UNITED STATES PATENTS

| Number | Name | Date |
|--------|------|------|
| 491,469 | Carver | Feb. 7, 1893 |
| 1,031,462 | Paine | July 2, 1912 |
| 1,109,347 | McIntyre | Sept. 1, 1914 |
| 1,370,319 | Kennedy | Mar. 1, 1921 |
| 1,551,381 | Foss | Aug. 25, 1925 |
| 1,838,134 | Cozzens | Dec. 29, 1931 |
| 2,099,678 | Curtis | Nov. 23, 1937 |
| 2,103,944 | Gullborg | Dec. 28, 1937 |
| 2,118,755 | Bergert | May 24, 1938 |
| 2,291,430 | Ingersoll | July 28, 1942 |
| 2,387,468 | Ritzel | Oct. 23, 1945 |
| 2,469,349 | Zeidler | May 3, 1949 |
| 2,525,117 | Campbell | Oct. 10, 1950 |